W. E. DARROW.
TRANSMISSION EQUALIZATION ARRANGEMENT.
APPLICATION FILED JAN. 29, 1920.
1,403,544.
Patented Jan. 17, 1922.
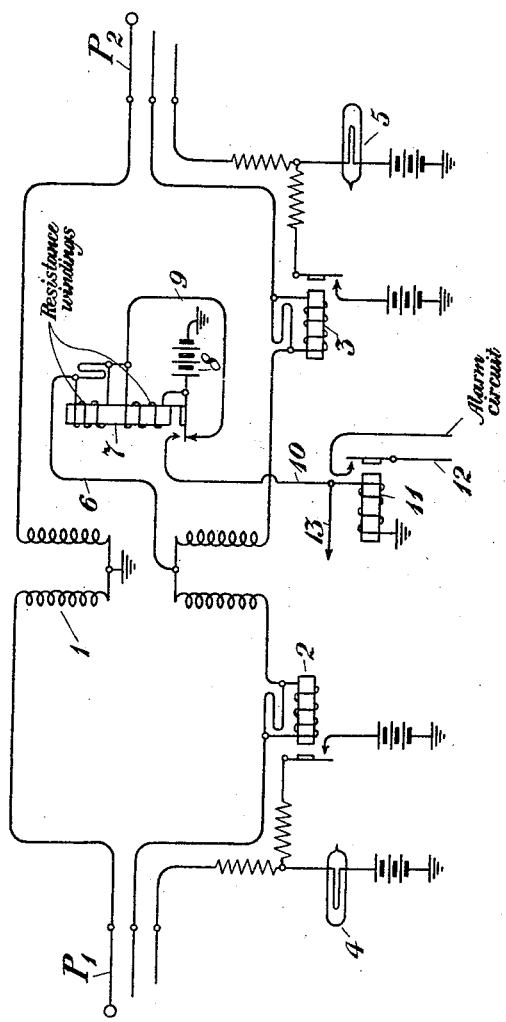
INVENTOR
W. E. Darrow
BY
ATTORNEY

UNITED STATES PATENT OFFICE.

WIRT E. DARROW, OF BROOKLYN, NEW YORK, ASSIGNOR TO AMERICAN TELEPHONE AND TELEGRAPH COMPANY, A CORPORATION OF NEW YORK.

TRANSMISSION EQUALIZATION ARRANGEMENT.

1,403,544.  Specification of Letters Patent.  Patented Jan. 17, 1922.

Application filed January 29, 1920. Serial No. 354,863.

*To all whom it may concern:*

Be it known that I, WIRT E. DARROW, residing at Brooklyn, in the county of Kings and State of New York, have invented certain Improvements in Transmission Equalization Arrangements, of which the following is a specification.

This invention relates to transmission systems and more particularly to means for automatically equalizing and rendering the transmission over such systems uniform.

A particular instance wherein it would be desirable to utilize the transmission equalization arrangements of this invention would arise in connection with central office cord circuits or trunk circuits. Such cord and trunk circuits and the equipment associated therewith have usually been designed to operate with a 24 volt battery and the margin of safety with respect to such circuits and equipment has been based on operation with current from a battery of this voltage. However in some instances it is desirable to utilize a 48 volt battery to supply the talking current in circuits of this type. When the cord or trunk circuits are supplied with 48 volt battery there is considerable danger of injuring the associated equipment, such as the repeating coils, if there should be excessive current flow over the line due to trouble in the system caused by short circuits or grounds. For example if the cord or trunk were plugged into a line with which was associated a grounded protector set, this would tend to ground the ring side of the cord or trunk and cause excessive current to flow though the repeating coil. The currents through the coils, due to such troubles, would produce sufficient heat in the coils to melt the compound and to cause it to run out. Other equipment than the repeating coils might be seriously injured by an excessive current flow over the circuit, and furthermore such excess current flow might be caused by many varieties of causes. Accordingly it is one of the primary objects of the invention to provide arrangements for rendering uniform the current flow in a system so as to afford protection to the equipment associated with said system. A further object consists in equalizing transmission so that uniform transmission may be provided for when connections are made with lines of different electrical characteristics. Other objects and features of the invention will appear more fully from the detailed description hereinafter given.

The invention may be more fully understood from the following description together with the accompanying drawing in which is illustrated a circuit diagram embodying a preferred form of the invention.

In the drawing is illustrated a cord circuit terminating in the plugs $P_1$ and $P_2$ and including the windings of a repeating coil 1. Included in the ring conductor of the cord circuit are the usual supervisory relays 2 and 3, which control the signal lamps 4 and 5 respectively. The talking current for the connection is supplied from battery 8, which for purposes of illustration may be assumed to be of 48 volts. The battery 8 is connected to the lower windings of repeating coil 1 by means of conductors 6 and 9 and the upper winding of relay 7. The lower winding of relay 7 is short circuited by conductor 9 and the break contact of said relay. The upper winding of relay 7 may be of relatively low resistance while the lower winding may be of high resistance. The relay 7 is adjusted so that it will not operate on the normal current from battery 8, over conductor 9, upper winding of relay 7, over conductor 6, and thence out over the ring conductor of the cord. However should some change occur in the normal electrical condition of the cord or associated circuits, which would cause the current flow to increase above normal, such increase in current will cause the relay 7 to operate. The operation of relay 7 will cause it to pull up its lower armature and thus remove the short circuit about the lower and high resistance winding of relay 7. The talking current from battery 8 will now be supplied to the ring side of the cord through both of the windings of relay 7 in series, and thence over conductor 6. The inclusion of the high resistance of the lower winding of relay 7 in this manner in the current supply circuit will tend to materially reduce the current flow thereover and restore it to normal and thus will tend to prevent destruction of apparatus associated with the system, which might be caused by an excessive flow of current. The operation of relay 7 will also close a circuit from battery 8, armature and make contact of relay 7, conductor 10, winding of relay 11, to ground, thereby operating relay 11. The operation of relay 11 will close the circuit 12, which is an alarm circuit, and may operate any desirable type of alarm device, such as a lamp or bell, to indicate that the current flowing over the system has increased above normal. An additional conductor 13 is illustrated connected in parallel with conductor 10, whereby the relay 11 and the alarm circuit 12 may be utilized in common with other circuits.

While the arrangements of the invention have been illustrated as associated with a cord circuit, it is understood that they may equally well be used with other types of circuits in a transmission system. Furthermore while the advantages of the arrangements of the invention have been pointed out as a protective device for protecting apparatus in the circuit from an excessive current flow, it is pointed out that they may be utilized, if desired, to regulate and equalize transmission so that uniform transmission may be provided in systems of different electrical characteristics. Accordingly while the invention has been illustrated in certain specific arrangements which have been deemed desirable, it is understood that it is capable of embodiment in many and widely varied forms without departing from the spirit of the invention as defined in the appended claims.

What is claimed is:

1. In a transmission system a link circuit comprising a talking circuit and a relay having a plurality of windings connected in series, one of said windings being included in said talking circuit, the other of said windings being short circuited by said talking circuit when said relay is unoperated.

2. In a transmission system a link circuit comprising a talking circuit, and arrangements for equalizing transmission in said circuit, said arrangements comprising a relay having a plurality of windings, one of said windings being included in said talking circuit, and means responsive to a decrease in the resistance of said system for including both of said relay windings in series in said talking circuit, whereby the resistance of said system may be increased again.

3. In a transmission system a link circuit comprising a talking circuit, and arrangements for equalizing transmission in said circuit, said arrangements comprising a relay having a plurality of windings, one of said windings being included in said talking circuit, said relay being adjusted to remain unoperative when the current flow over said system remains within certain limits and to operate when the current flow exceeds said limits, and means controlled by the operation of said relay for including all of said relay windings in series in said talking circuit, whereby the resistance in said circuit may be increased and the transmission therein maintained constant.

In testimony whereof, I have signed my name to this specification this 27th day of January, 1920.

WIRT E. DARROW.